Nov. 28, 1967  H. T. DEAN  3,354,572
FLUID PRESSURE ACTUATED EXTENSIBLE SPEAR GUN
Filed Sept. 24, 1965  2 Sheets-Sheet 1
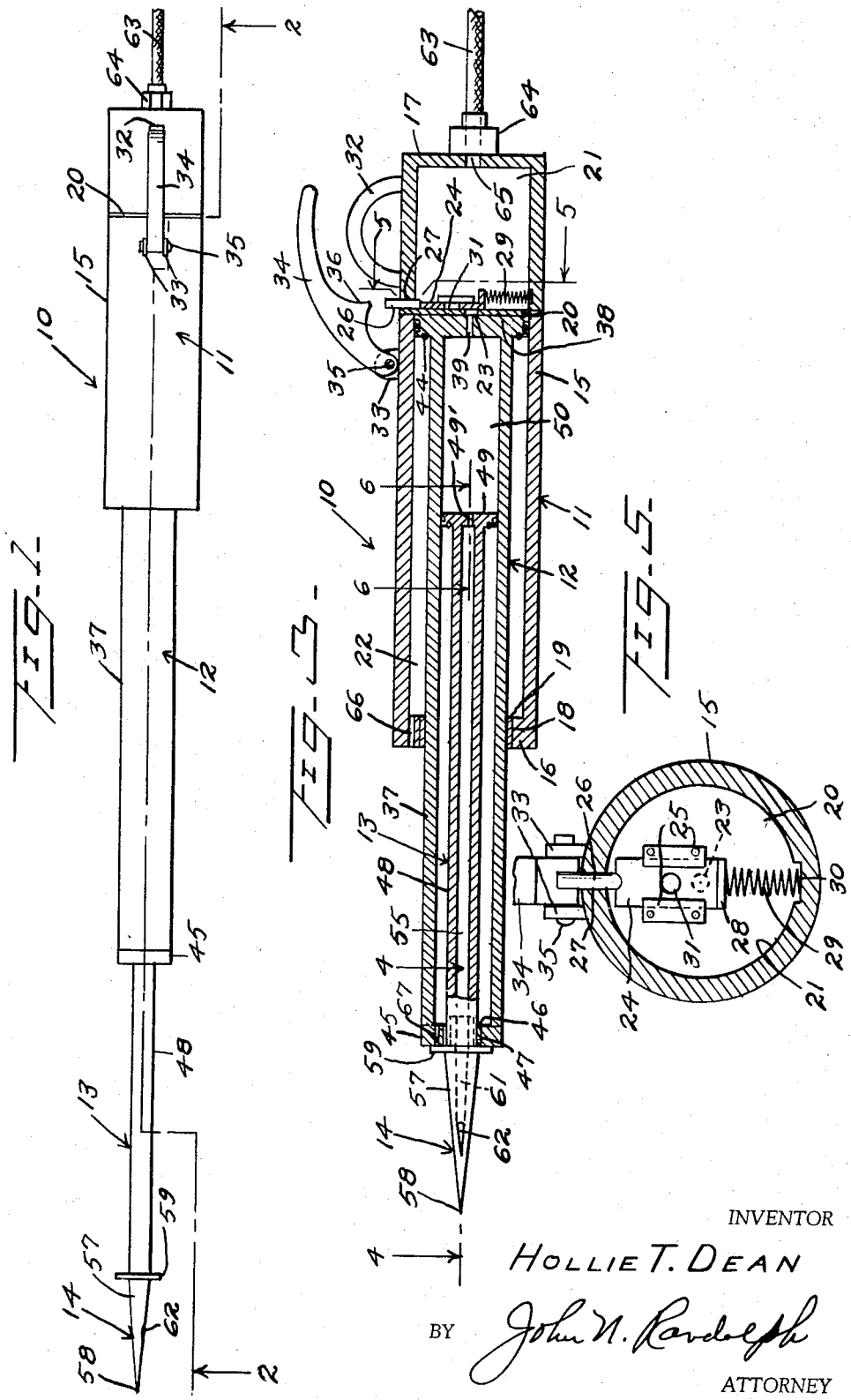
INVENTOR
HOLLIE T. DEAN
BY John N. Randolph
ATTORNEY

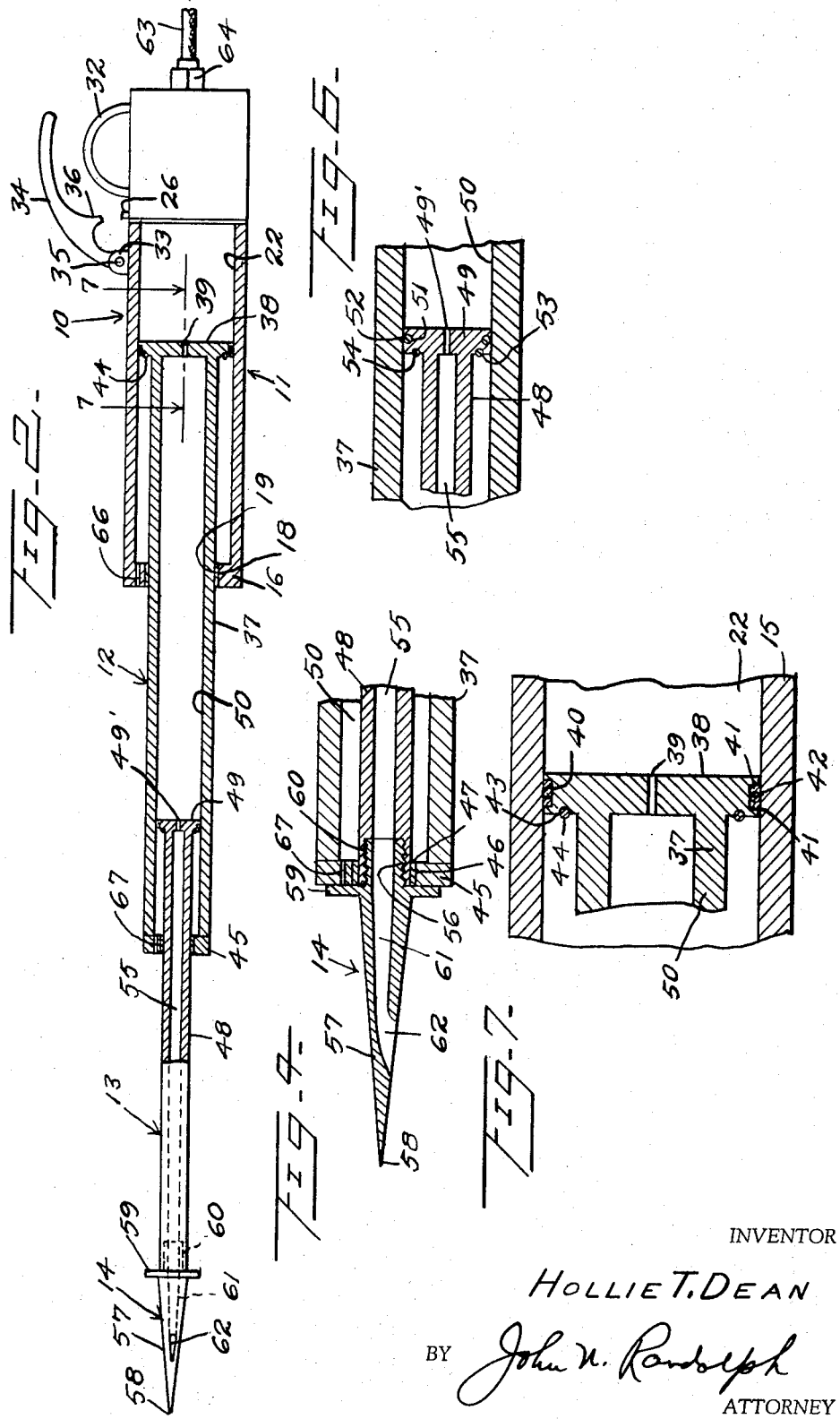

United States Patent Office 3,354,572
Patented Nov. 28, 1967

3,354,572
FLUID PRESSURE ACTUATED EXTENSIBLE SPEAR GUN
Hollie T. Dean, 107 N. Artizan St., Williamsport, Md. 21795
Filed Sept. 24, 1965, Ser. No. 489,986
6 Claims. (Cl. 43—6)

This invention relates to a novel weapon of extremely simple construction which is primarily adapted for use underwater against creatures of the sea.

A primary object of the invention is to provide a weapon which may be readily carried in the hand and operated for rendering an underwater creature, for example, immobile and harmless, for capturing the creature, or to enable the user of the weapon to escape from the creature.

More particularly, it is an object of the invention to provide a fluid pressure actuated extensible spear gun that is so constructed that the fluid medium utilized to extend the spear will be injected into the body of a creature struck by the spear.

Various other objects and advantages of the invention will hereinafter become more fully apparent from the from the following description of the drawings, illustrating a presently preferred embodiment thereof, and wherein:

FIGURE 1 is a top plan view, partly broken away, showing the spear gun partially extended;

FIGURE 2 is a longitudinal sectional view, partly in side elevation, taken substantially along the line 2—2 of FIGURE 1;

FIGURE 3 is an enlarged longitudinal sectional view, partly in side elevation, showing the spear gun with the parts thereof in a retracted position;

FIGURE 4 is an enlarged fragmentary sectional view taken substantially along a plane as indicated by the line 4—4 of FIGURE 3;

FIGURE 5 is an enlarged cross sectional view through the spear gun, taken substantially along the line 5—5 of FIGURE 3;

FIGURE 6 is an enlarged fragmentary longitudinal sectional view taken substantially along a plane as indicated by the line 6—6 of FIGURE 3, and FIGURE 7 is an enlarged fragmentary sectional view taken substantially along a plane as indicated by the line 7—7 of FIGURE 2.

Referring more specifically to the drawings, the extensible spear gun in its entirety is designated generally 10 and includes an outer or base section 11, an intermediate section 12, an inner section 13 and a spear point 14. The parts 11, 12, and 13 combine to form a spear shaft.

As best seen in FIGURES 2 and 3, the outer or base section 11 comprises a tube 15, which is preferably of circular cross section, having a forward end wall 16 and a rear end wall 17. The forward end wall 16 has a large opening 18 which is preferably lined with a nylon bushing 19. The section 11 is provided with a partition 20 which is located nearer the rear wall 17 than the front wall 16 and which divides the section 11 into a rear chamber 21 and a forward chamber 22. The partition 20 is provided with a port 23 connecting the chambers 21 and 22.

As best seen in FIGURE 5, the gate valve 24 is slidably disposed against the partition 20 in the chamber 21 and has its side edges engaging in guide members 25 which are secured to said partition. A stem 26 projects from one end of the valve 24 outwardly through an opening 27 in the tube 15. The other end of the gate valve 24 has an out-turned flange 28 against which one end of a compression spring 29 bears. The other end of the spring 29 seats in an internal recess 30 of the tube 15. The spring 29 urges the valve 24 upwardly to a closed position with its opening or port 31 out of registration with the port 23 for closing the port 23. A bail-like handle 32 is secured to the exterior of the tube 15, longitudinally thereof, between the opening 27 and the rear wall 17 and in alignment with said opening. A pair of transversely spaced apertured ears 33 project from the tube 15, between the front wall 16 and opening 27. One end of a lever 34 engages between the ears 33 and is swingably connected thereto by a pivot element 35 which extends therethrough and through said ears. The lever 34 is disposed in alignment with the handle 32 and has a projection 36 which is disposed to engage the outer end of the stem 26 for moving the valve port 31 into registration with the port 23 when the lever 34 is swung toward the handle 32.

The intermediate section 12 comprises an elongated tube 37 which engages slidably in the bushing 19 and which has a rear end wall 38 which is larger than the outer diameter of the tube 37 to form a piston head which fits slidably in the cylinder formed by the chamber 22. Piston head 38 has a small central port 39. As seen in FIGURE 7, the piston head 38 has an endless groove 40 in the periphery thereof which contains two endless nylon guides 41 and an endless nylon seal 42 which is interposed between said guides. The forward face of the piston head 38, around the tube 37, has a groove 43 containing an endless cushioning ring 44. The tube 37 has an end wall 45 at its other forward end, as best seen in FIGURES 2 and 3, which is provided with a central opening 46 which is lined with a nylon bushing 47 to slidably receive the tube 48 of the inner spear section 13.

As best seen in FIGURE 6, the tube 48 has a piston head 49 at its rear end which engages slidably in the bore 50 of the tube 37, which thus forms a cylinder for said piston head. Piston head 49 has a small central port 49'. The periphery of the piston head 49 has an endless groove 51 containing an endless sealing ring 52 which is preferably formed of nylon, and a front face of the piston head 49, around the tube 48, is provided with an endless groove 53 containing a cushioning ring 54. The bore 55 of the tube 48 has an enlarged internally threaded forward end 56.

The spear point 14 includes an elongated body 57 which tapers from an inner end thereof to a point 58 at its outer end. A flange 59 surrounds the inner end of the body member 57 and has an externally threaded nipple 60 extending therefrom which is threadedly secured in the bore portion 56. The point 14 is provided with a passage 61 which extends through the nipple 60, flange 59 and a part of the body 57. The end of the passage terminating in the nipple 60 registers with an end of the bore 55, and the other end of the passage 61 opens laterally outward of a part of the body 57 to form a discharge port 62, which is spaced from the flange 59.

One end of a hose or flexible conduit 63 is connected by a fitting 64 to the rear end wall 17 and communicates with the chamber 21 through a port 65 in the wall 17. The other end of the hose 63, not shown, is adapted to be connected to a source of supply of a fluid medium under pressure, such as compressed air or carbon dioxide, which can be contained in a tank, not shown, which may be worn on the back of the user of the spear gun 10.

The spear gun 10 may be carried with either hand by the handle 32 with the sections thereof in a retracted position, as seen in FIGURE 3. The chamber 21 will be pressurized by the compressed gas supplied thereto through the hose 63 and held trapped therein by the closed valve 24. When using the spear, the other hand of the user will normally grasp the section 11 near its end wall 16 for pointing the spear gun at an underwater creature, for example, constituting an intended target, and a part of the hand grasping the handle 32 will be engaged around the free end of the lever 34. When the spear gun 10 is sufficiently close to and pointed at the target, the lever 34 will be squeezed toward the handle 32 so that its projection 36 will engage and displace the stem 26 inwardly for moving the valve 24 downwardly, as seen in FIGURE 5, to position the valve port 31 in registration with the port 23. The compressed medium will then pass through the ports 31 and 23 into the cylinder 22 and impinge against the piston head 38 for driving said piston head and the section 12 from its retracted position toward and beyond its partially extended position of FIGURES 1 and 2. A part of the compressed medium will enter the cylinder 50 through the port 39 for driving the piston head 49 of the section 13 toward an extended position relative to the sections 11 and 12.

The end wall 16 is provided with a port 66 to allow air to escape from the part of the chamber 22 disposed between the wall 16 and the piston head 38 and around the tube 37, and the end wall 45 has a similar port 67 for the escape of air from the part of the cylinder 50 disposed between the wall 45 and piston head 49 and around the tube 48. Normally, before the spear gun 10 is fully extended, the spear point 14 will strike and embed itself in the target, not shown, to a depth so that the compressed medium which flows through the port 49' of the piston head 49 into the bore 55 will pass through the passage 61 to be discharged from the port 62 thereof into the body of the creature struck by this spear point 14 for killing or immobilizing the creature.

When pressure is released on the lever 34, the spring 29 will return the valve 24 to its closed position after which the spear sections can be manually returned to their retracted positions of FIGURE 3. Ports 66 and 67 act as vent ports for venting the chambers of the cylinders 22 and 50, respectively, which communicate with said ports, as the spear gun is being returned to a retracted position. If the spear sections 12 and 13 move to fully extended positions, when the cylinders 22 and 50 are pressurized, then the rings 44 and 54 will act as bumpers to engage the walls 16 and 45, respectively. The ports 23 and 31 are substantially larger than the port 39 to insure pressurizing the cylinder 22, behind the piston head 38, for forcibly driving the section 12 toward an extended position, and the port 49' is smaller than the port 39 to insure pressurizing the cylinder 50, behind the piston head 49, for forcibly driving the section 13 toward an extended position. Stem 26 has a close fitting engagement in the opening 27 to prevent the escape of pressure from the chamber 21. The spear gun 10 may be formed of stainless steel or plastic.

The tube 15 is divided by the partition 20 to enable the piston head 38 to be assembled therein, and the sections of the tube are then secured, in any conventional manner, to the opposite sides of the partition 20. End wall 45 is secured to the tube 37, in any conventional manner, after the piston head 49 has been assembled therein.

Various modifications and changes are contemplated and may obviously be resorted to without departing from the scope or function of the invention as hereinafter defined by the appended claims.

I claim as my invention:

1. A fluid pressure actuated extensible spear gun comprising a spear shaft formed of telescopically connected tubular sections, a spear point connected to the inner one of the sections at a forward end of the shaft, means supplying a gas under pressure to the outer one of the sections adjacent to a rear end of the shaft, and apertured piston heads constituting rear ends of all but the outer shaft section and against which the compressed gas impinges and through which the gas passes when the spear shaft is pressurized thereby for extending the shaft to propel the spear point away from said outer section.

2. A spear gun as in claim 1, said spear point having a passage communicating at one end with the bore of said inner shaft section and having an opposite end opening outwardly thereof, whereby a part of the fluid medium under pressure will be injected by the spear point into the body of a creature struck by the spear point.

3. A spear gun as in claim 1, and a manually actuated valve for regulating the release of the gas under pressure into the shaft sections.

4. A spear gun as in claim 1, a normally closed valve for shutting off the supply of gas under pressure, and manually actuated means for moving said valve to an open position.

5. A spear gun as in claim 1, the bores of the tubes of all but the inner shaft section constituting cylinders for said piston heads, and means for venting the forward ends of said cylinders to enable the piston heads to slide freely therein.

6. A fluid pressure actuated extensible spear gun comprising an elongated tubular outer section constituting one end of the spear gun, a spear point constituting the other end thereof, telescopically connected tubular sections telescopically connected to the outer section, said spear point being connected to a forward end of the inner one of said telescopically connected sections, said telescopically connected sections having rear ends constituting pistons each provided with a port, and means supplying a gas under pressure through a rear end of the outer section to impinge against said piston heads and to pass through the ports thereof for extending the telescopic sections relative to one another and to the outer section for forcibly propelling the spear point away from said outer section.

References Cited

UNITED STATES PATENTS

| | | | |
|---|---|---|---|
| 2,217,820 | 10/1940 | Rowe | 43—19 |
| 2,671,289 | 3/1954 | McCullough | 43—19 |
| 2,703,944 | 3/1955 | Molyneux | 43—6 |
| 2,839,862 | 6/1958 | Hanshaw | 43—6 |
| 2,977,706 | 4/1961 | Merz | 43—19 |
| 2,981,026 | 4/1961 | Wedrall | 43—6 |
| 3,118,242 | 1/1964 | Snyder | 124—11 X |

SAMUEL KOREN, *Primary Examiner.*

WARNER H. CAMP, *Examiner.*